Jan. 11, 1938.  C. A. DE GIERS  2,104,898
ELECTRICALLY CONTROLLED LIQUID LEVEL INDICATOR
Filed May 10, 1934  2 Sheets-Sheet 2
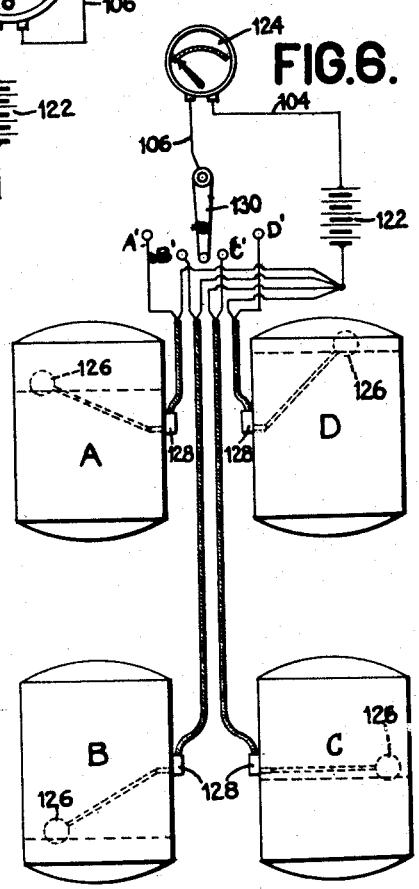
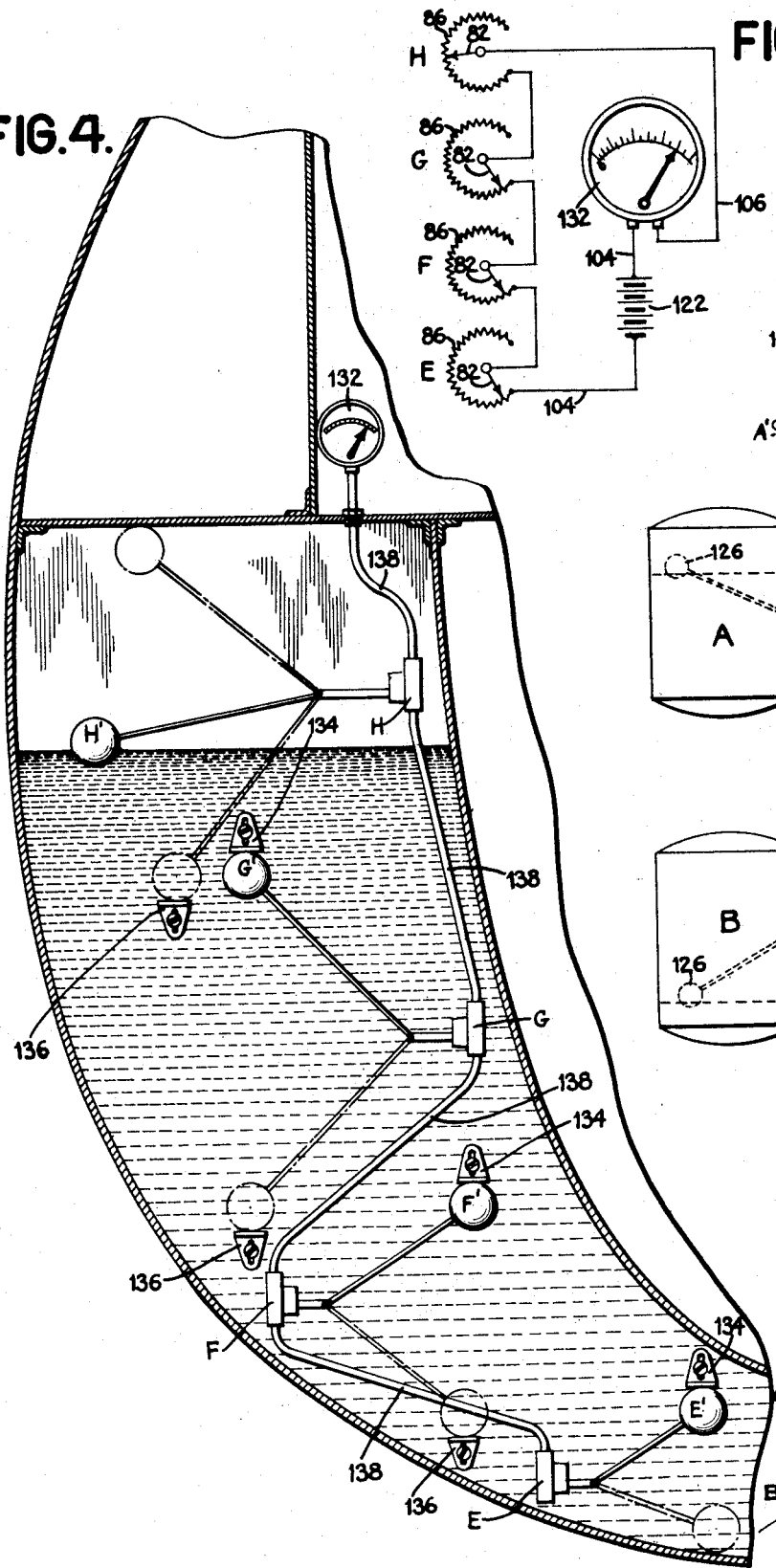
INVENTOR
Clarence A. de Giers
BY
Cooper, Kerr & Dunham
ATTORNEY Patented Jan. 11, 1938

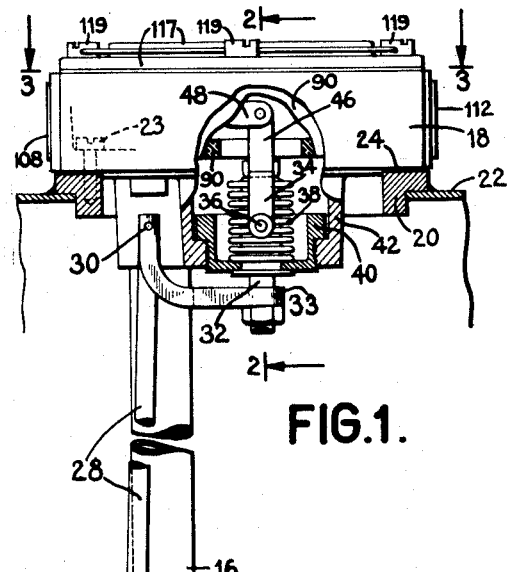
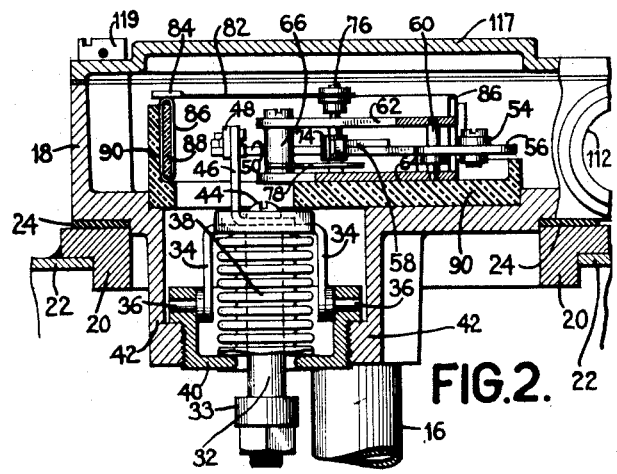
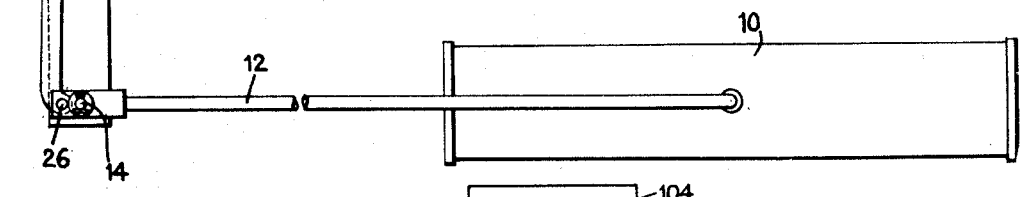
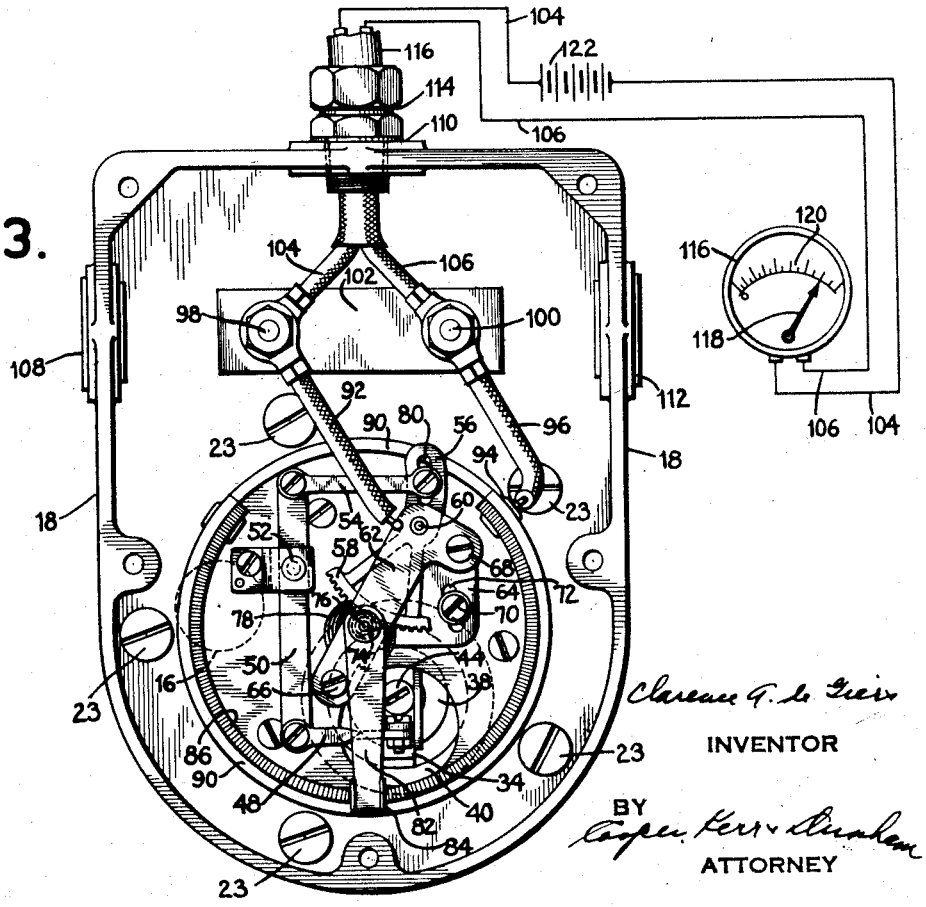

2,104,898

UNITED STATES PATENT OFFICE 2,104,898

ELECTRICALLY CONTROLLED LIQUID LEVEL INDICATOR

Clarence A. de Giers, Forest Hills, N. Y.

Application May 10, 1934, Serial No. 724,857

3 Claims. (Cl. 201—48)

This invention pertains to instruments for indicating the amount of liquid in a tank.

An object of the invention is to improve the type of instrument disclosed in my Patent No. 1,945,736. In that apparatus the indicator, in the form of a graduated chart and pointer, is attached directly to the tank. The present invention contemplates the removal of the indicator to a point remote from the tank, and the operation of the indicator electrically under control of the float in the tank. This remote control is effected through the agency of a float actuated rheostat at the tank and wired to the remote indicator.

Another object is to provide means for operatively connecting an indicator with a plurality of tanks similar to each other, so that the contents of any selected tank may be instantly determined.

Another object is to operatively connect an indicator to a plurality of float-controlled rheostats, placed at different elevations in a tank too deep for a single float, so as to indicate the tank contents at any liquid level.

Another object is to provide improved means for sealing the rheostat chamber from the tank contents, thereby removing the fire hazard in case the tank contents are inflammable.

Further and other objects and advantages will be apparent from the specification and claims, and from the accompanying drawings which illustrate what is now considered the preferred embodiment of the invention.

Fig. 1 is an elevation, partly in section, of a rheostat, its housing and its actuating mechanism, installed on a tank.

Fig. 2 is an enlarged view on line 2—2 of Fig. 1.

Fig. 3 is an enlarged view on line 3—3 of Fig. 1.

Fig. 4 is a diagrammatic view of a series of instruments placed one above the other in a deep tank, and indicating the contents on a single indicator.

Fig. 5 is a wiring diagram of the arrangement of Fig. 4.

Fig. 6 is a diagrammatic representation of four similar tanks, and a single indicator adapted to indicate the liquid level in any selected tank.

Referring to Figs. 1, 2 and 3, 10 designates a float, pivotally mounted on the end of float arm 12, and adapted to rest on liquid in a tank. Arm 12 is fulcrumed at 14 on the end of a tubular support 16 projecting from the body of the rheostat chamber 18, which is mounted on a ring 20 welded to tank 22 and secured thereto by screws 23. Packing 24 makes a tight joint between body 18 and ring 20. The short end of arm 12 is connected at 26 to a link 28, which at its other end is connected at 30 to one end of a curved arm 33, the other end of which is rigidly attached to the lower end of stud 32, which through the instrumentality of yoke 34, (rigid with the upper end of stud 32) is pivoted for rocking movement on trunnions 36, 36, substantially in alignment with pivot 30. Sealed to the upper end of stud 32, and hanging downwardly around the stud and within yoke 34, is a flexible sleeve in the form of "sylphon" 38. The lower open end of the sylphon is sealed to the cup-shaped plug 40, which supports trunnions 36 and is tightly threaded into the lower end of a hollow boss 42, forming an integral extension of housing 18 and projecting through ring 20 into the tank. Also secured to the top of stud 32, by screw 44, is an upwardly extending arm 46 forming, in effect, an extension of stud 32, the rocking of which around trunnions 36 serves to actuate the rheostat, as will appear.

It will be understood from the above that sylphon 38 permits the rocking of stud 32 and its arm 46 about trunnions 36 under control of float 10, while hermetically sealing the interior of the housing from the contents of the tank. It should also be understood that, although the device is illustrated in the top of a tank, it is just as well adapted for installation in the bottom of the tank or on the side of the tank, either below or above the liquid. This feature is very important in such jobs as an airplane installation, where the device must be placed on any available part of the tank.

The upper end of arm 46 is connected by link 48 to one end of a horizontal lever 50 fulcrumed at 52. The other end of lever 50 is connected by link 54 to a curved arm 56 integral with toothed sector 58 supported on a spindle 60 rotatably mounted in upper and lower plates 62 and 64 which, with studs 66 and 68, comprise a movement-supporting frame held in position by screw 70 passing through slot 72 in plate 64, thereby providing a zero adjustment for the instrument.

Sector 58 engages pinion 74, on shaft 76 rotatably supported in frame 62—64, so that shaft 76 rotates when arm 56 is rocked by link 54. The customary spring 78 prevents back lash between pinion and sector teeth. Slot 80 in arm 56 provides an adjustable point of connection between link 54 and arm 56 to control the angular rotation of shaft 76 with relation to the angular motion of float arm 12. In other words, slot 72 provides a zero adjustment, and slot 80 a capacity adjustment.

Fast on the upper end of shaft 76 is an arm 82 having at its outer end a shoe 84 in contact with the coils of resistance wire 86 wound on an insulating strip 88 and supported in the circular insulating cup 90 to form a rheostat under control of float 10, an electric circuit being provided through wire 92, plate 62, shaft 76, arm 82, shoe 84, resistance wire 86, terminal 94 and wire 96. Wires 92 and 96 terminate at binding posts 98 and 100 on insulating block 102 within housing 18, and from posts 98 and 100 cables 104 and 106 pass out of the housing through one of the openings 108, 110 or 112, provided for the purpose, whichever is most convenient. The unused openings are plugged, and the used one is provided with a sealing device such as 114, and, under certain conditions, a conduit 116, so that there is no possibility of liquid or gas entering the rheostat housing. A cover plate 117 secured to the top of the housing by screws 119, seals the housing on the side away from the tank.

Wires 104 and 106 lead to an indicator 118 having a pointer 119 moving under control of the rheostat over a graduated chart 120. Current is supplied from a source 122, and the amount of current flowing through the indicator (and therefore the position of hand 119) is controlled by the position of arm 82, controlled by the float, the position of the float being in turn controlled by the level of liquid in the tank. Therefore the indicator, with its appropriately graduated chart, gives an indication of the amount of liquid in the tank.

Fig. 6 shows how a single indicator 124 may be used to indicate the contents of any selected tank, A, B, C or D, the tanks being of similar shape and dimensions, and each being provided with a float 126 and rheostat 128 of the type described above. By moving switch 130 into contact with one of the four contact buttons A', B', C' or D' a circuit is established through the indicator and the rheostat of the corresponding tank, to show on the indicator the contents of that tank. This arrangement is particularly valuable in an airplane, as it enables the pilot, with only one indicator, to ascertain the contents of various tanks scattered about the machine.

Fig. 4 shows an installation of a plurality of rheostats so arranged in a deep tank as to show the tank contents on a single indicator 132.

The rheostats E, F, G and H are supported by brackets (not shown) at different elevations, and their floats E', F', G' and H' are so arranged that as the tank fills and each float reaches its upper limit of travel (controlled by an adjustable stop 134), the float next above it begins to move upwardly from its position of rest (controlled by an adjustable stop 136). As the tank is emptied the reverse movement of the floats takes place.

The rheostats and indicator are interconnected by copper tubes 138, and the instruments are wired in series, as shown in Fig. 5. As each float rises it moves its corresponding rheostat arm 82 towards "off" position and as the float falls, the arm is moved towards "on" position. Thus in Fig. 5 rheostats E, F and G are "off", while H is in an intermediate position corresponding to the level of the liquid in the tank, and the pointer of the indicator is pointing to the appropriate part of the chart. If the liquid level rises, arm 82 will move further towards the "off" position, more current will pass through the indicator and its pointer will move further to the right. If, on the other hand, the level falls, the floats will successively fall, each moving its arm 82 to "on" position, so that the indicator hand will move towards zero, just as if the four rheostats were a single instrument controlled by a single float. As the tank fills again the reverse movements will take place.

It is to be understood that the invention is not limited to the specific embodiment herein illustrated and described, but may be used in other ways without departure from its spirit as defined by the following claims.

I claim:

1. In a liquid level indicating apparatus, a housing adapted for attachment to a tank containing liquid, a rheostat within said housing, a flexible sleeve for sealing the interior of said housing from the contents of the tank, a movable member within said sleeve pivoted on said housing outside of said sleeve and sealed against the contents of said tank, means responsive to change of level of the liquid for swinging said movable member about its pivot, and means interconnecting said member and said rheostat whereby said rheostat is controlled by said member.

2. In apparatus of the class described in combination, a float adapted for movement by change of level of liquid in a tank, a pivoted member, means interconnecting said float and said pivoted member whereby said member is movable by said float, a rheostat controllable by said member, and a flexible device rigidly secured to said member and hermetically sealing said rheostat from the contents of the tank, the pivot for said member located outside of said flexible device and sealed against the contents of said tank.

3. In a liquid level indicating apparatus, a housing adapted for attachment to a tank containing liquid, a rheostat within said housing, a flexible sleeve for sealing the interior of said housing from the contents of the tank, a movable member within said sleeve and rigidly attached thereto, a yoke pivoted within said housing and rigidly attached to the upper end of said movable member to permit swinging movement of said member, whereby the pivot for said yoke is sealed against the contents of said tank, means responsive to change of level of the liquid for swinging said movable member upon its pivot, and means interconnecting said member and said rheostat whereby said rheostat is controlled by said member.

CLARENCE A. DE GIERS.